United States Patent [19]

Goldman

[11] Patent Number: 4,556,760
[45] Date of Patent: Dec. 3, 1985

[54] HAND-OFF FILTER FOR CELLULAR MOBILE RADIO

[75] Inventor: Stuart O. Goldman, Columbus, Ohio

[73] Assignee: ITT Corporation, New York, N.Y.

[21] Appl. No.: 619,251

[22] Filed: Jun. 11, 1984

[51] Int. Cl.$^4$ .............................................. H04Q 7/04
[52] U.S. Cl. .................................. 179/2 EB; 455/33; 455/56; 455/69
[58] Field of Search ............................ 179/2 E-2 EC; 455/31, 33, 34, 53, 54, 56, 62, 68-71

[56] References Cited

U.S. PATENT DOCUMENTS 4,475,010  10/1984  Huensch et al. ................. 179/2 EB
4,485,486  11/1984  Webb et al. .................... 179/2 EB X Primary Examiner—Gene Z. Rubinson
Assistant Examiner—W. J. Brady Attorney, Agent, or Firm—John T. O'Halloran; Jeffrey P. Morris

[57] ABSTRACT

A cellular mobile radio-telephone system incorporates hand-off equipment for effecting a hand-off of communication links coupled to a mobile subscriber transceiver as the transceiver travels from one cell to an adjoining cell. The hand-off equipment includes a filter which smoothes voice channel signals received from the mobile transceivers so as to permit a more precise determination as to when a reduction in signal amplitude indicates the need for a hand-off. The operation of the filter includes long and short term averaging of a sequence of signal samples. Circuitry is also provided for predicting a time of signal fade-out based on differences in the amplitude of successive samples or groups of samples. Also disclosed is circuitry for commanding a change in transmitter gain in a transceiver as a function of signal fade-out.

14 Claims, 4 Drawing Figures

HAND-OFF FILTER FOR CELLULAR MOBILE RADIO

CROSS REFERENCE TO RELATED U.S. PATENT APPLICATION

U.S. Ser. No. 457,155; filed Jan. 11, 1983; entitled "Cellular Mobile Radio Service Telephone System" and assigned to the assignee of this application.

BACKGROUND OF THE INVENTION

This invention relates to cellular mobile radio-telephony systems and, more particularly, to a filtering operation useful in evaluating variations in amplitude or signal-to-noise ratio or padding etc. of voice frequency (VF) transmissions at a mobile subscriber telephone station traveling in the vicinity of a cell border, thereby to facilitate a hand-off between cells.

Cellular radio-telephony is used at numerous sites in this country and overseas. Such a telephone system permits communication between two mobile telephone stations as well as between a mobile station and a fixed station.

Such systems are formed of clusters of cells wherein each cell is assigned a predetermined set of voice frequency channels, the bands being spaced apart in the frequency spectrum so as to permit simultaneous transmission of many telephone conversations by many stations without interference between communications in the various bands. In order to insure that there is no interference between the assigned frequency bands of one cell and the assigned frequency bands of a contiguous cell, the bands in the contiguous cell are located at different portions of the frequency spectrum than the bands of the first-mentioned cell. The same frequency bands are repeated at more remote cells, and the power of signal transmission in any one band is limited in amplitude so as to become attenuated to a sufficiently low, non-interfering level at the frequency bands of the remote cell.

Cellular mobile radio-telephone systems are described in the literature. One such system referred to as an "Advanced Mobile Phone Service" is described in *The Bell System Technical Journal*, January 1979, Vol. 58, No. 1, pp 1-269.

Multiplexing of individual subscriber channels for communication via common RF (radio frequency) link is accomplished, preferably, by means of statistical multiplexers. Such multiplexers are described in an article entitled "Controlling Data Communications: Statistical Multiplexer Moves In" by H. J. Hindin in *Electronics*, July 28, 1981, pp 141-148, and in "A Buyers Guide to Today's Volatile Statistical Multiplexers" by J. H. Scharen-Guivel and A. A. Carlson in *Data Communications*, March 1982, pp 97-126. A switching configuration for a mobile system is disclosed in "A Distributed Switching Approach to Cellular Coverage" by R. E. Pickett in *Telecommunications Magazine*, February 1983. A network control system for use in cellular mobile radio-telephony may include the commercially available ITT System 1210 hardware and software.

In the construction of a cellular system, a group of the foregoing cells is clustered about a system switching network or piece of the network which allocates the available frequency bands in any one cell among the various mobile radio-telephones with which communication is desired. Such switching networks provide for the Coupling of a telephone conversation of one frequency band in a first cell with a second frequency band in a second cell or, alternatively, with a long-distance trunk circuit which connects the first cell with a desired cell in another cluster or a land subscriber. In addition, well-known control circuitry is provided for the transmission of command signals to the mobile stations for directing their respective transmissions on the allocated frequency bands.

As a mobile subscriber moves from one cell to the next cell, a hand-off procedure is followed wherein the central switching network commands the mobile station to switch frequency from the band which was used in the first cell to the frequency of a new band to be used in the second cell. While such hand-offs are usually accomplished in an effective manner, a problem arises in that, under certain circumstances, such hand-off procedures can become excessively burdensome to a central computer utilized in the operation of the central switching network.

In particular, the problem is manifested by a variation in the amplitude of signal transmissions with the mobile station at and in the vicinity of the interface between the two contiguous cells. The variation may be characterized by a sequence of pulsations in amplitude or signal-to-noise ratio or padding, rather than a monotonic variation in amplitude. A characteristic in hand-off decision-making circuitry presently in use is the measurement of the amplitude of signal transmission with the mobile station. The central switching network may include directive antennas which designate a specific sector in azimuth which shows generally the position of the mobile station with respect to the cell cluster. Thus, a variation in amplitude of signal transmissions within predetermined amplitude ranges serves as an indication that the mobile transmitter is centrally located within a cell, or is located near a boundary of the cell. Thereby, by monitoring the amplitude of such signal transmissions, the decision-making circuitry is able to signal the central switching network at the appropriate time when a hand-off is to be made from one frequency band to another frequency band.

Under conditions wherein the presence of tall buildings or other typographical features induce pulsations in the otherwise monotonic variation in signal amplitude, the decision-making circuitry receives false alerts as to the proximity of the mobile station to the cell border and, accordingly, proceeds to initiate hand-offs back and forth between the two contiguous cells in accordance with the pulsations sensed in the transmitted signal amplitude. Such activity in the decision-making circuitry places a burden on the computer employed in such circuitry in that a much larger usage of the computer is required for a single hand-off procedure.

During intervals of relatively low traffic volume, such additional burdens on the computer may not degrade the overall number of telephone communications which can be simultaneously handled. However, during intervals of relatively large volumes of telephone traffic, such a burden may limit the amount of telephone communications which can be handled by the computer and the hand-off circuitry of the central switching network. It is further noted that such excessive switching back and forth between contiguous cells interferes with the general plan of channel allocation among the available frequency bands.

SUMMARY OF THE INVENTION

The aforementioned problem is overcome and other advantages are provided by a hand-off filter which is incorporated into the hand-off decision-making circuitry of a mobile radio-telephone system. In accordance with the invention, the hand-off filter is coupled to the frequency bands of individual ones of the subscriber telephone channels to average the pulsations of signal amplitude so as to provide a more uniform variation of signal amplitude as a mobile subscriber approaches the boundary between two cells of the radio telephone system. The more uniform variation in signal strength, provided by the filter, is then used in the decision-making process for effectuation of a hand-off procedure.

The filter operates with samples of the subscriber voice-frequency signal. The filter provides both a short term and a long term average of samples of the subscriber signal. The two averages are then summed with the most recent sample, thereby to transmit a succession of smoothed subscriber signal samples to the decision-making circuitry. The invention permits the hand-offs to be accomplished even in the presence of pulsating signal strength while greatly reducing any tendency for a back and forth succession of hand-offs taking place along the border between two contiguous cells.

A further feature of the invention is the use of successive samples of signals received from a mobile station to compute a rate of change in signal amplitude. The rate of change is used to predict the amount of time which will elapse until the signal fades below a desired level at which good reception is assured. Prior to that elapsed time, typically three seconds before the time lapses, a hand-off request is generated.

Yet a further feature of the invention is the monitoring of the voice channel signal strength in the generation of a command signal which is transmitted to the mobile station for altering the magnitude of the voice channel signal strength within a prescribed limited range to counteract fading and insure more reliable communication.

BRIEF DESCRIPTION OF THE DRAWING

The aforementioned aspects and other features of the invention are explained in the following description taken in connection with the accompanying drawing wherein.

DETAILED DESCRIPTION

Figure 1:
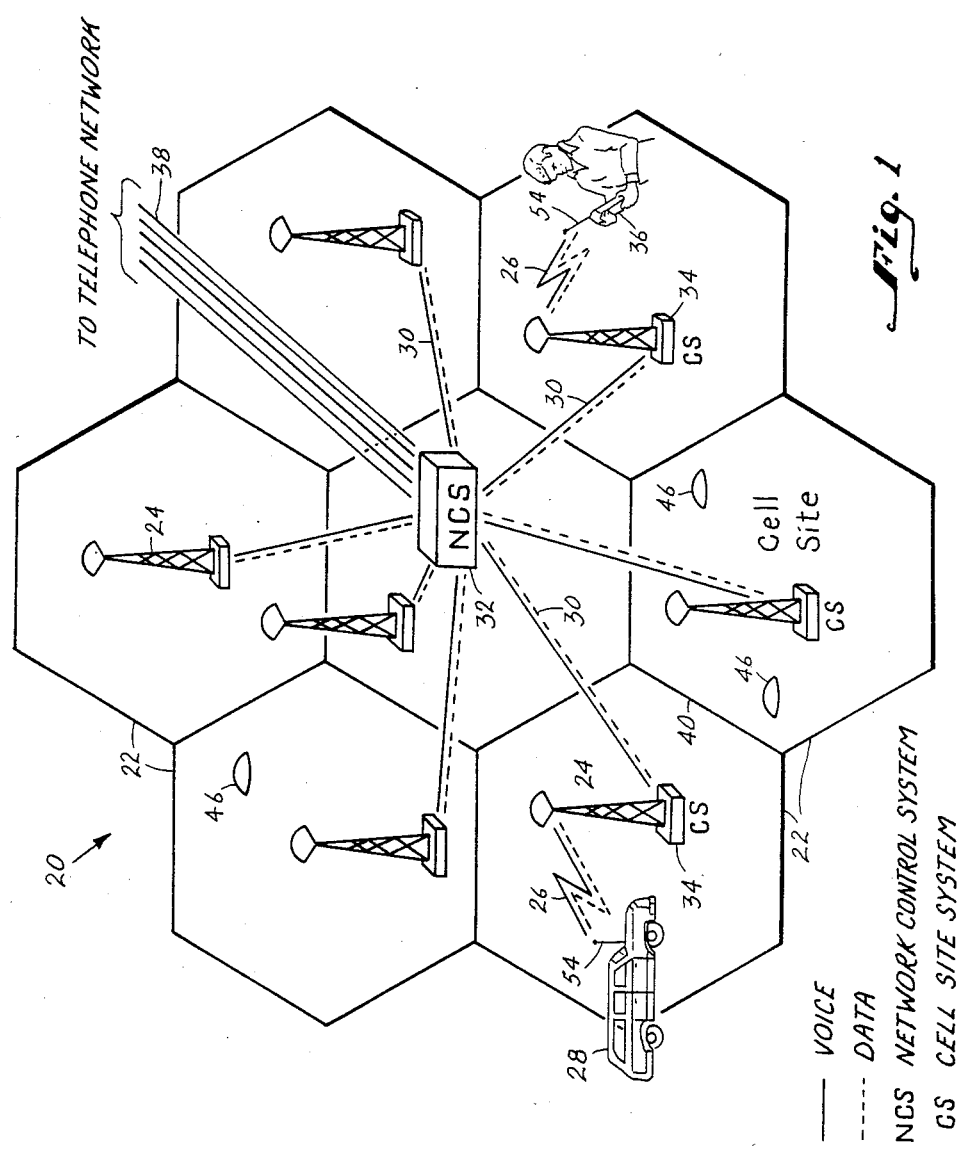
FIG. 1 is a diagrammatic view of a cellular mobile radio telephone system showing the various links whereby control and data signals are transmitted.

In FIG. 1 there is shown a typical cellular radio-telephone system 20 comprising a set of contiguous cells 22, each cell 22 being the site of an antenna 24 by which a radio communication link 26 is established with a mobile subscriber such as a vehicle 28. The cells 22 are connected via communication links 30, which links may employ radio or cable, to a network control system 32. At the site of each cell 22, a system 34 incorporating transponder equipment (not shown in FIG. 1) connects with the antenna 24 for communication via a link 26 to a mobile subscriber and via a link 30 to the network control system 32.

The cell site system 34 provides for communication between two mobile subscribers traveling within the same cell. The network control system 32 provides for communication between mobile subscribers in two different cells, such as between the vehicle 28 in one cell 22 and a portable telephone 36 in a second cell 22. Each of the links 26 and 30 includes both voice/data signals and control signals represented, respectively, by solid and dashed lines. The control signals carry the identity of a called subscriber in another one of the cells 22, a well as that of a subscriber at a distant location which is to be reached via the system 32 and trunk lines 38 of a telephone network. The control signal also carries information with respect to a designated frequency band to be employed by a cell system 34 in communicating with a mobile subscriber.

As a mobile subscriber passes from one cell to the next cell, a hand-off procedure is followed at the interface between the two cells 22, such interface being in the vicinity of a border 40 between the two cells. The network control system 32 performs the hand-off procedure wherein, in accordance with established and well-known practice, a mobile subscriber such as the vehicle 28 is assigned a new frequency band for transmission of voice and data along a link 26 to the system 34 of the new cell. It is noted that the frequencies of the voice transmission band allocated to one of the cells 22 differs from those allocated to the contiguous cells 22. Thereby, each of the mobile subscribers has a separate channel so that there is no confusion as to subscriber signals, particularly near a border 40 wherein the signals of two vehicles 28 would be present on both sides of the border 40. The transmitted signals of the respective subscribers are also retained below a predetermined limit in amplitude so as to introduce no interference at longer distances spanning many cells 22. Thereby, at the longer distances, the same frequency bands can be reallocated without interference from a distant subscriber operating in the same frequency band.

The hand-off procedure is based on the location of the subscriber and the amplitude of signals received at a cell site along the link 26 from the subscriber. The antenna 24 is positioned approximately at the middle of a cell 22 or in a corner so that transmissions of a subscriber become attenuated as the subscriber moves toward the border 40. In addition, the antenna 24 includes sector antenna elements which provide information as to the location of the subscriber so that a determination can be made as to which cell the subscriber is moving towards. This information is communicated via control signals to the network control system 32 which after locating actions are performed then selects a free frequency band, and directs the mobile transceiver operated by the subscriber to switch to the new frequency allocation.

In accordance with the invention, the system 20 incorporates equipment to facilitate a hand-off. As will be described subsequently, this equipment provides for a filtering of the transmissions received from a subscriber so as to densensitize the hand-off procedure to momentary pulsations in received signal strength, which pulsations would give a false indication as to when a hand-off should be initiated. In addition, the equipment of the invention provides the additional features of predicting when a subscriber will move into position for undergoing a hand-off, and also provides for a commanding a variation in the amplitude of his transmissions so as to counteract the effects of signal fading. This also reduces unneccessary attempts at hand-off to receive strong signal from the subscriber.

Figure 2:
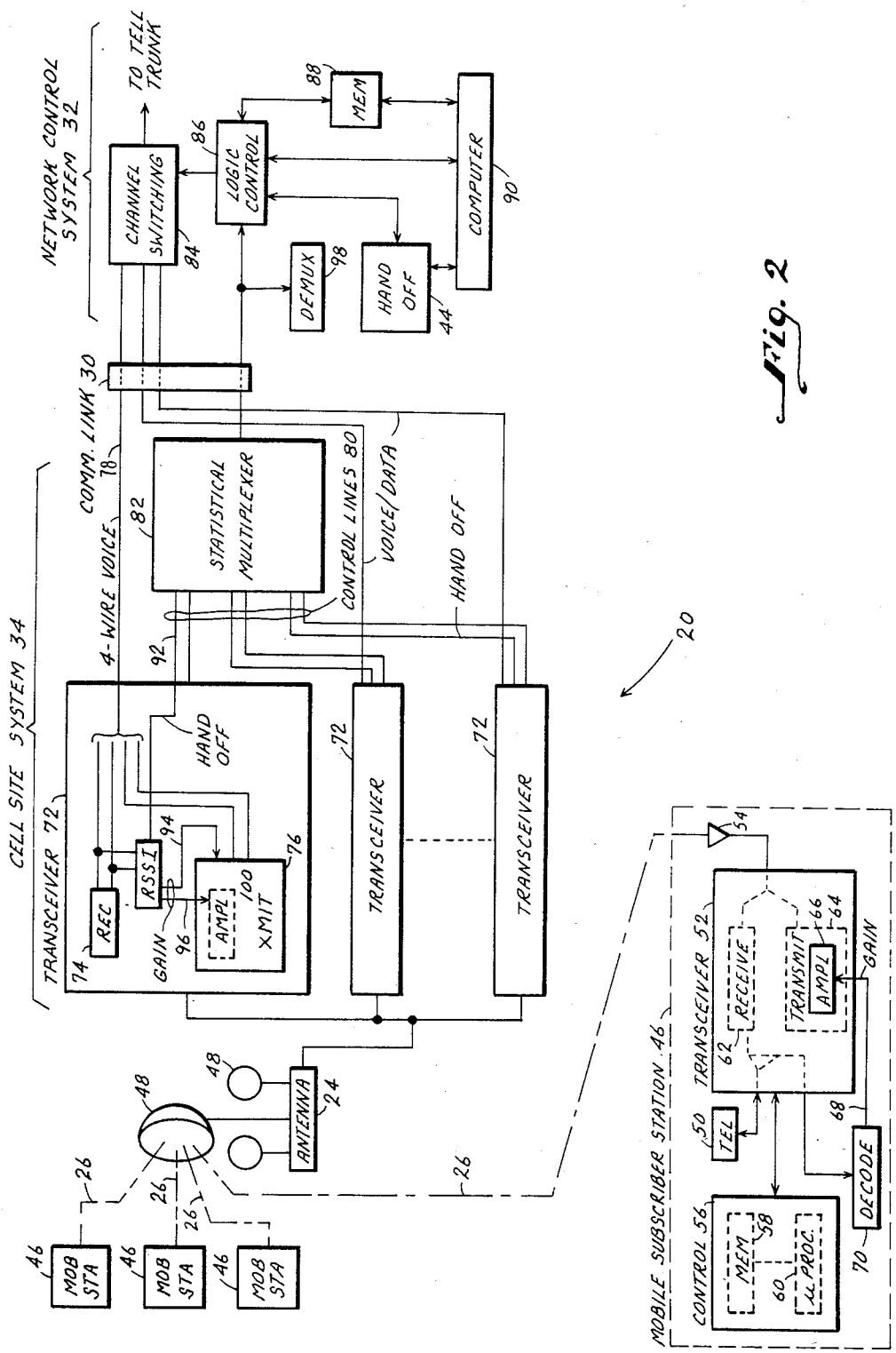
FIG. 2 is a block diagram showing the interconnection of the filter of the invention with circuitry of the system of FIG. 1.

FIG. 2 shows the location of the hand-off equipment of the invention within the system 20 of FIG. 1. The equipment is a received signal strength indicator 42 which may be part of cell site transceiver which is coupled to the voice channel utilized by a mobile subscriber, and provides output signals to a hand-off unit 44 in the network control system 32. The indicator 42 is to be located at a point of convenience in the fabrication of the system 20 and, accordingly, may be located at the site of the network control system 32 wherein access may be had to voice signals communicated between cells 22, or may be located at each of the cell site systems 34 at which points connection can be made with the voice channels. In the embodiment of the invention depicted in FIG. 2, individual indicators 42 are provided at each of cell sites in the cell systems 34, with individual ones of the indicators 42 being connected to individual ones of the voice frequency channels allocated to that cell.

FIG. 2 is a simplified representation of the components of the system 20, and shows only those portions of the system 20 which are necessary for an understanding of the interconnections of the indicator 42, the hand-off unit 44 and the components of the system 20. Other portions of the system 20, being well-known, have been deleted from FIG. 2 so as to facilitate the representation of the invention. FIG. 2 includes the cell site system 34 coupled via a link 30 to the network control system 32, the system 34 connecting with an antenna 24 for communication via links 26 with mobile subscribers 46. The mobile subscribers 46 include the vehicle 28 and the portable telephone 36 of FIG. 1, as well as other stations which may move about from site to site. The antenna 24 includes an array of antenna elements 48 which provide azimuthal coverage about a cell 22, one of the elements 48 being shown communicating via the lines 26 to the subscribers 46. The array of elements 48 provide information as to the direction of a subscriber 46 from the site of the antenna 24, thereby to indicate which portion of a border 40 of a cell is to be involved in a hand-off procedure.

Typically, a mobile subscriber station 46 includes a telephone 50 coupled via a transceiver 52 to an antenna 54. Operation of the transceiver 52 is controlled by a controller 56 which incorporates a memory 58 coupled to a microprocessor 60. The transceiver 52 and the controller 56 are well-known components of commercially available mobile telephony stations, the memory 58 storing a serial number and other identification of the station, with the microprocessor 60 being used to tune a receiver 62 and a transmitter 64 of the transceiver 52 to a specific voice-frequency channel designated by a paging signal transmitted by the cell site system 34. Also included is an amplifier 66 which is located in the transmitter 64.

In accordance with a feature of the invention, the amplifier 66 includes gain control circuitry permitting the gain of the amplifier 66 to be varied in accordance with an external gain control signal on line 68. Signals received by the receiver 62 over the link 26 include the aforementioned voice and control signals, the control signals being formatted as digitally multiplexed signals. Such signals are readily processed by the microprocessor 60. In addition, in accordance with the invention, the digitally multiplexed signals also include a digital word designating the amount of gain to be employed by the amplifier 66. Accordingly, the mobile subscriber station 46 also includes a decoder 70 which detects the presence of the gain-control word of the multiplexed signal, and converts the word into an analog format for the gain control signal on line 68. Thereby, the gain of the amplifier 66 can be altered from the initial value of gain at which the amplifier 64 has been preset to some other value of gain as may be commanded by the cell system 34.

The cell site system 34 includes a set of transceivers 72 each of which includes a receiver 74 and a transmitter 76 which are coupled via a four-wire voice line 78. In addition, each transceiver 72 is connected via a control line 80 to a statistical multiplexer 82 which combines the signals of the various control lines 80 to a multiplexed format for communication by the link 30 with the network control system 32. Each transceiver 72 connects with the antenna 24 for two-way communication with the subscribers 46. The four-wire line 78 permits two-way communication of voice signals between a transceiver 72 and the network control system 32.

The network control system 32 includes switching equipment 84 by which signals propagating on a designated frequency band in a channel of one cell 22 (FIG. 1) are switched to a different designated frequency band in a channel associated with another of the cells 22. Incorporated with the channel switching equipment 84 is a logic control unit 86, a memory 88 and a computer 90. The memory 88 stores the identifications of subscribers engaged in communications with each other, as well as the specific channels over which they are communicating. Also stored are the identities of channels available for use by the subscribers. The computer 90 connects with the logic unit 86 and the memory 88 for directing the switching equipment 84 to institute connections between the various channels so as to connect the individual subscribers engaged in their respective communications. The logic unit 86, in addition to connecting with the switching equipment 84, also connects with the hand-off unit 44 to permit the computer 90 to direct a switching of channels to accomplish a hand-off procedure. While the hand-off unit 44 is shown separate from the computer 90 so as to facilitate explanation of the invention, it is to be understood that, in a typical commercially available system, the decision-making procedures of the hand-off unit 44, these procedures determining when and if a hand-off is to be made, can be accomplished within circuitry of the computer 90 under suitable programming of the computer 90. Of course, in the event that heavy traffic may overload the computer, then the hand-off circuitry can always be provided as additional circuitry separate from the computer, which circuitry would be connected as shown by the hand-off unit 44 in FIG. 2.

To accomplish features of the invention, the indicator 42 receives voice signals from the output telephone line of the receiver 34 and utilizes these signals, in a manner to be described, to provide hand-off signals on line 92 and gain control signals on lines 94 and 96. Line 92 forms a part of a control line 80 of transceiver 72 and serves to couple hand-off signals from the indicator 42 to the multiplexer 82. The multiplexer 82 then communicates the hand-off signals via the link 30 to the network control system 32 wherein a demultiplexer 98 retrieves the hand-off signals and applies them to the hand-off unit 44. Thereby, the hand-off unit 44 can accomplish hand-off procedures by use of signals provided by the indicator 42 in accordance with the invention. The gain control signal provided by the indicator 42 along line 94 is transmitted via the transmitter 76 to the mobile subscriber station 46 to provide the aforementioned gain-control signals on line 68 in such ones of the mobile stations 46 which may require a change in the gain of the amplifier 66 to facilitate a hand-off procedure. The gain control signal provided by the indicator 42 on line 96 is applied to an amplifier 100 in the transmitter 76 so as to vary the amplitude of signal transmissions from the antenna 24 to a selected one of the mobile stations 46 when such alteration of gain would be useful in effecting or defering a hand-off.

Figure 3:
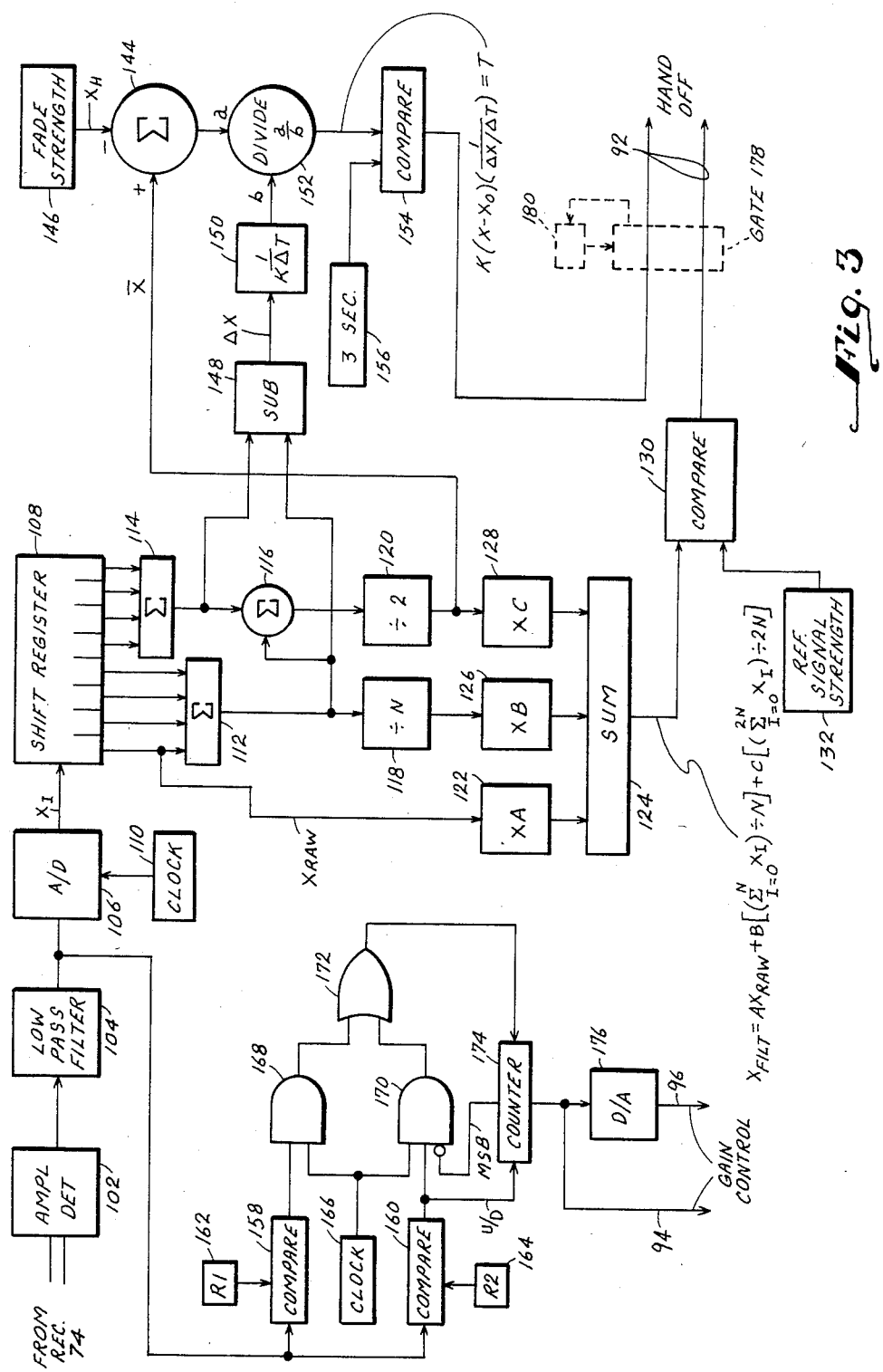
FIG. 3 is a more detailed view of the filter of the invention constructed in hardware.

In FIG. 3 there is shown a block diagram of the indicator 42 (FIG. 2) and its connections with the receiver 74, the hand-off signal line 92 and the gain control lines 94 and 96. The operation of the indicator 42 involves storing of signal samples, averaging of the samples, and summation of the average values to provide for a filter function as is set forth in the mathematical equation set forth in the figure adjacent the output line 92. The indicator 42 also provides the function of subtraction of different values of signal to provide a differential signal useful in predicting the time to a hand-off, as is shown in an equation presented in the figure adjacent the output line 92. The indicator 42 furthermore provides the function of comparing the received signal with reference signals to determine how much gain control is necessary. All of these functions can be accomplished by means of a computer having storage circuitry, an arithmetic unit and a comparator operating under suitable programming. Alternatively, the indicator 42 can be constructed of circuitry specifically set aside for performing the foregoing functions as is shown in FIG. 3. The choice of the specific embodiment of the indicator 42 is a matter of design to be selected in accordance with the capacity of a computer presently used in a telephony system to incorporate these additional functions, and as to whether the foregoing functions might be more readily implemented by the use of special circuitry as shown in FIG. 3. A particular advantage in the circuitry of FIG. 3 is that it more readily demonstrates the operation of the indicator 42 than might be shown by means of a computer program.

With reference to FIG. 3, the indicator 42 comprises an amplitude detector 102, a low pass filter 104, an analog-to-digital converter 106, a shift register 108, a clock 110, three summers 112, 114, and 116, and two dividers 118 and 120. The detector 102 is coupled to the receiver 74 and detects the amplitude of the voice/data signal provided by the receiver 74. By way of example, in the event that the voice signal has been modulated onto a carrier, then the detector 102 extracts the amplitude modulation function from the carrier. Alternatively, this function may be incorporated within the receiver 74 in which case the detector 102 would not be required in the indicator 42. The voice, or voice/data signal is encouple via the filter 104 to the converter 106. The converter 106 is strobed by pulses of the clock 110 to sample the voice signal and to provide digital representations of each sample to the shift register 108. For the operation of the circuitry of the indicator 42, the sampling rate need be no faster than that necessary to accommodate the fading rate of the subscriber signal as a mobile subscriber station 46 moves towards the boundary of a cell. By way of example for anticipated vehicle speeds, such as the speed of the vehicle 28 of FIG. 1, and for typical terrain, a sampling rate of 20 samples per second may be presumed. Since the voice spectrum transmitted by the receiver 74 is on the order of 3,000 to 4,000 Hertz, it is advantageous to provide short term averaging of the voice signal by the low pass filter 104 so as to reduce the bandwidth of the signal to ten Hertz. The information in the ten Hertz bandwidth is then properly sampled at double the bandwidth, namely, at the foregoing 20 Hertz sampling rate.

With reference to the formula in FIG. 3 for the filtered signal, the letters A, B, and C represent scaling factors. X is a signal sample provided by the converter 106. N is a number of samples utilized in an averaging process. The expression shown in the formula provides for the summation of a sample of raw data (at the output of the converter 106) with a short term average (represented by the first summation in the formula) plus a longer term average (represented by the second summation in the formula). In the operation of the indicator 42, successive ones of a sequence of samples from the converter 106 are fed serially into the register 108. The cells of the register 108 are provided with individual output terminals whereby the samples stored therein may be individually outputted to the summers 112 and 114. By way of example, the register 108 is shown with eight cells for storage of a sequence of eight samples. The most recent four samples are applied to the summer 112 which sums the four samples together and applies the resultant sum to the divider 118. The previous four samples are summed together by the summer 114 and applied via the summer 116 to the divider 120. The output sum of the summer 112 is also applied via the summer 116 to the divider 120. The summer 116 adds together the sums of the summers 112 and 114 to provide an output sum equal to the sum of all eight samples stored in the register 108. The divider 118 divides by a factor of four where $N=4$. The divider 120 divides by eight where $N=4$.

Comparing the foregoing mathematical operations with the formula, it is seen that the output of the summer 112 is in reference to the first summation in the formula. The output of the summer 116 is in reference to the second summation of the formula. The division by the dividers 118 and 120, respectively, results in the short term and long term averages corresponding to the first and second summations of the formula. By way of example in the implementation of the formula, the raw data sample is presumed to be the most recent sample in the shift register 108 and, accordingly, this sample is scaled by the scale factor A by means of a multiplier 122, with the resultant product being applied by the multiplier 122, to a summer 124. Similarly, the short term average at the output terminal of the divider 118 is scaled by the factor B by a multiplier 126 with the resultant product being applied to the summer 124. The long term average at the output of the divider 120 is scaled by the factor C by a multiplier 128 with the product thereof being applied also to the summer 124. The summer 124 sums together the foregoing three products to provide the filtered output signal as is set forth by the foregoing formula. The comparator 130 compares the filtered signal of the summer 124 with a reference signal of a signal source 132 to determine whether the filtered voice signal is relatively strong or relatively weak. A relatively strong signal indicates that the subscriber 46 (FIGS. 1 and 2) is relatively close to the antenna 24 and has sufficient distance from a cell border 40 such that no hand-off is to be initiated. A relatively weak signal indicates that the subscriber 46 is relatively far away from the antenna 24 and sufficiently close to the cell border 40 such that a hand-off is to be initiated.

The indicator 42 further comprises the following components for performance of the prediction function, namely, a summer 144, a source 146 of a reference signal, a subtractor 148, a multiplier 150, a divider 152, a comparator 154, and a source 156 of a reference signal.

In operation, the subtractor 148 subtracts the output of the summer 114 from the output of the summer 112 to provide a differential value indicative as to whether the amplitude of the voice signal is rising or falling. While the subtractor 148 might be coupled directly to individual ones of the samples of the cells of the register 108 to indicate a rising or falling between successive samples, the connection as shown to the summers 112 and 114 is advantageous in that the resultant differential is based on further averaging of the voice signal. Thereby, the differential value of the voice signal is insulated from the effects of pulsations and undulations in the magnitude of the voice signal. The output of the subtractor is one of the terms in the equation for the time prediction as shown in the figure. The output of the subtractor 148 is then divided by an interval of time equal to the time elapsed between four of the samples in the sequence of samples stored in the register 108. This time interval conforms to the difference in time elapsed between the sums of the two summers 112 and 114. The division is accomplished by use of the multiplier 150 wherein a fixed factor, equal to the reciprocal of the foregoing time interval, is applied as a multiplicative factor. Also included within the operation of the multiplier 150 is a scale factor K (also shown in the equation).

Continuing with the operation of the prediction function, the summer 144 subtracts a fixed amount of fade signal, provided by the reference source 146, from an average value of the voice signal, as provided at the output of the divider 120. The output of the summer 144 is thus the anticipated decrease in voice signal amplitude which must occur prior to initiation of a hand-off. The divider 152 divides the foregoing quantity by the rate of change in signal amplitude, which rate of change is provided at the output terminal of the multiplier 150. The resulting expression is the amount of time required to reach the hand-off voice signal amplitude. This is the amount of time presented by the foregoing equation. In order to give a three second warning, the output signal of the divider 152 is compared with a reference, three-second signal of the source 156. Thereby, as the predicted time for initiation of a hand-off drops to three seconds, the comparator 154 provides a hand-off signal via the line 92 to the multiplexer 82 (FIG. 2) to initiate hand-off activity by the hand-off unit 44.

The indicator 42 comprises still further components for providing the gain control function, these components being, namely, comparators 158 and 160, two sources 162 and 164 of reference signals for the comparators 158 and 160, a clock 166, AND gates 168 and 170, an OR gate 172, a counter 174, and an analog-to-digital converter 176.

In operation, the comparators 158 and 160 receive the filtered voice signal from the filter 104, and compare the filtered signal with the reference signals of the sources 162 and 164. The two reference signals thereby establish an acceptable window for amplitude of the filtered voice signal. Thus, in the event that the filtered voice signal rises above the magnitude R1 of the reference signal of source 162, the comparator 158 outputs a logic-1, or high voltage, to an input terminal of the gate 168. In the event that the amplitude of the filtered voice signal falls below the magnitude R2 of the reference signal of source 164, the comparator 160 outputs a logic-1 signal to an input terminal of the gate 170. In response to actuation of the gate 168 or the gate 170 by output signals of the comparators 158 and 160, clock pulses are transmitted by the clock 166 via the gate 168 or the gate 170 to the gate 172, and via the gate 172 to an input terminal of the counter 174. The output signal of the comparator 160 is also applied to a control terminal of the counter 174 to designate whether the counter 174 is to count up or to count down. Thereby, whenever the amplitude of the filtered voice signal passes outside the foregoing window, the counter 174 proceeds to count pulses of the clock 166. The output count of the counter 174 appears on line 94 to serve as a gain control signal (FIG. 2) and is also applied to the converter 166 which converts the digital count to an analog voltage which serves as the gain control signal on line 96 (FIG. 2).

Since the amplitude of the voice signal transmitted over the links 26 (FIGS. 1 and 2) is not to exceed a certain value so as to avoid interference with transmitted signals in cells 22 of other cell clusters, a most significant bit (MSB) of the count of the counter 174 is also applied to a complemented terminal of the gate 170. The gate 170 passes clock pulses for raising the count of the counter 174 so as to raise the magnitude of a signal transmitted along a selected one of the links 26. Clock pulses are transmitted by the gate 168 for reducing the count and the magnitude of the signal on the designated link 26. The presentation of MSB signal at the gate 170 deactivates the gate 170 when the count reaches a maximum value. The minimum value of the count is zero. Thus, the operation of the gain control circuitry in commanding an increase or a decrease in the gain of amplifiers 66 and 100 (FIG. 2) thereby is restricted to a predetermined range of command signals, which command signals are coupled to the foregoing amplifiers, respectively, by the lines 94 and 96.

The foregoing description of the circuitry of FIG. 3 has shown an implementation by means of specific circuitry which has been included in the system 20 (FIGS. 1 and 2) for signalling the hand-off unit 44 (FIG. 2) to initiate a hand-off. The basic operation of the hand-off unit 44, which operation is well-known and is currently in use in cellular mobile telephony, is unchanged by the inclusion of the signals of the indicator 42. The two signals on line 92 from the comparators 130 and 154 serve as options which may be employed by the hand-off unit 44 and the computer 90 in effectuating a hand-off. If desired, both of these signals may be utilized by the simple expedient of programming the computer 90 to accept whichever signal comes first for initiating the hand-off. Thereby, the system 20 has the benefit of implementing a hand-off when either the magnitude of the transmitted voice signal is low, or when the amplitude is predicted to drop below an acceptable level within three seconds.

While the received signal strength indicator 42 has been shown incorporated into the equipment of the cell site system 34, it is to be noted that such an indicator can also be incorporated within the equipment of the mobile subscriber station 46. When located at the station 46, the indicator would signal the cell site system 34 to raise the magnitude of the signal transmitted along a link 26. If desired, the gain control signal need not be transmitted to both the transceivers 52 and 72 respectively at the mobile subscriber station 46 and the cell site system 34. For example, it may be desirable to provide the gain control function only for the transceiver 72 at the cell site system 34. With this arrangement, there is less chance of interference with the transmissions at a distant one of the cells 22, particularly in the case where the antenna 24 is directing the transmissions on a specific one of the channels in a direction away from a distant cell using the same frequency band in a communication channel. The variable gain feature is advantageously employed for the transceiver 52 of the mobile subscriber station 46 at those times when there is low traffic volume in which case there is little chance that the more distant cell 22 has selected a channel frequency equal to that being employed by the foregoing mobile subscriber station 46.

The operation of conventional cellular telephony systems may be further modified in accordance with yet another feature of the invention. Upon a determination that a hand-off of a mobile subscriber from one cell to another cell would be desirable, the computer 90 attempts to initiate transmission between the mobile subscriber and another cell by the hand-off procedure. If, upon a search of the memory 88 and locating actions, a suitable available channel is found, the hand-off is initiated. If the search for another channel is not successful, then the present channel via the present cell site system 34 is maintained even though the received signal strength indicator 42 may indicate that the signal strength is below the desired threshold. In order to prevent the transceiver 72 of the cell site system 34 from continuously reporting the condition of excessively low signal strength, this being indicated by the presence of the hand-off command signals on line 92, it is preferable to institute a periodic transmission of the hand-off command from the transceiver 72 to the multiplexer 82, and thereby reduce the signal traffic to which the computer 90 must respond. Such a feature can be introduced by passing the line 92 through a gate 178 (shown in phantom in FIG. 3) activated by a monostable multivibrator 180. The presence of an output signal from either of the comparators 130 and 154 during the passage of such signal through the gate 178 triggers the multivibrator 180 to momentarily shut down the gate 178. Subsequently, the multivibrator 180 reopens the gate 178, and becomes retriggered if one of the output signals is still present. Thereby, the presence of a long term signal at the output terminals of either of the comparators 130 and 154 is converted to a periodically occurring signal on line 92.

In the implementation of the gain control circuitry of FIG. 3, the clock 166 provides a rate of clock pulses which is sufficiently slow so as to institute a gradual change in the gain of the amplifiers 66 and 100 of FIG. 2. For example, a maximum change in gain corresponding to a maximum change in the value of the count of the counter 174 can occur in an interval of time which is longer than approximately one-half minute. More rapid changes in gain are to be avoided so as to insure stability in the operation of the system 20. The values of the reference signals and of the clock rates utilized in the gain control circuitry as well as in the other circuitry of FIG. 3 are all present during initialization of the system 20, this being accomplished before any communication among the various mobile subscriber stations.

The foregoing operation of the indicator 42, as explained with reference to FIG. 3, can also be accomplished by suitably programming the computer 90 for providing the functions described in FIG. 3 is set forth in FIG. 4.

Figure 4:
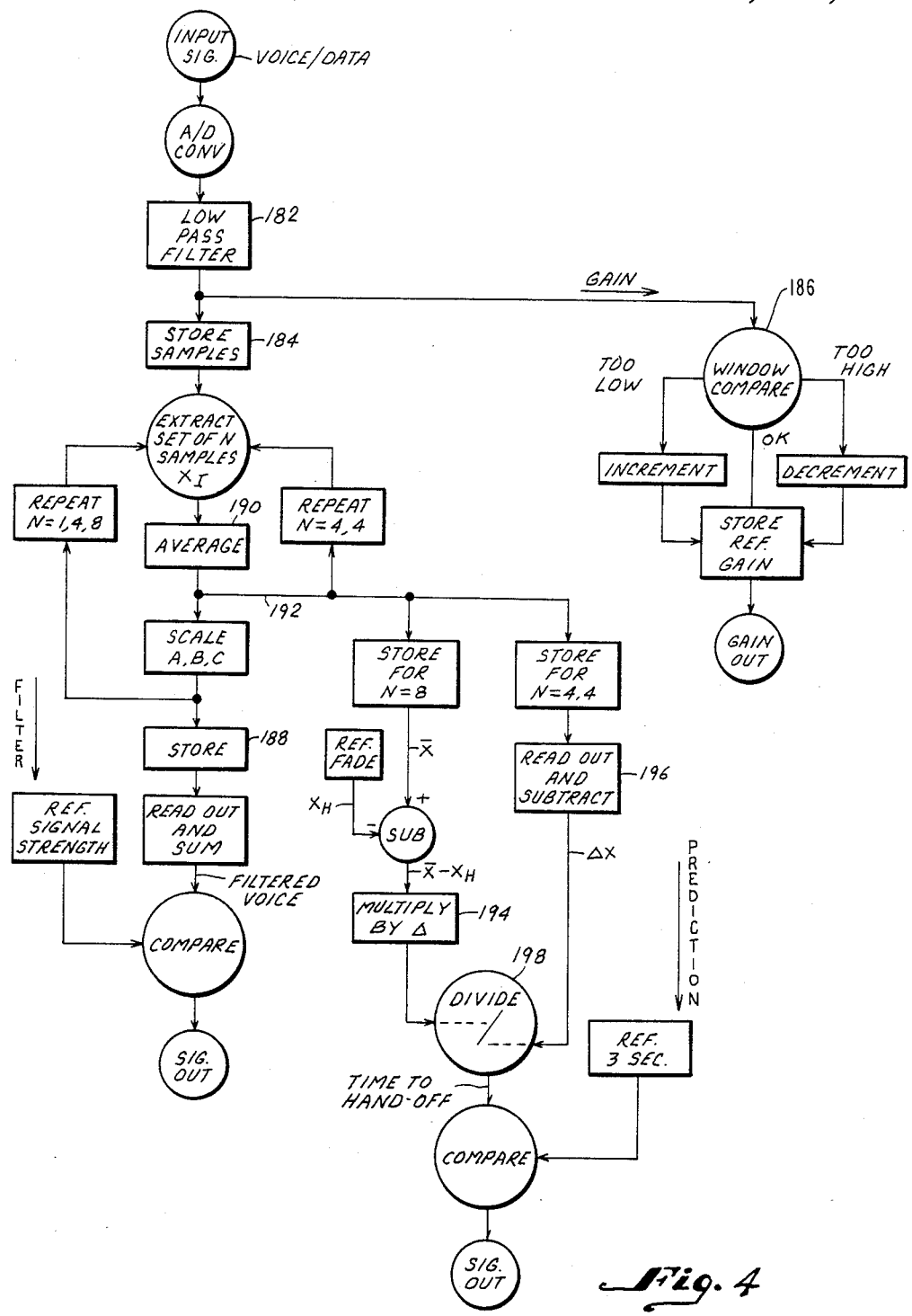
FIG. 4 is a flow chart disclosing a sequence of operations for implementation of the filter of the invention by means of a computer.

In FIG. 4, the input signal from the voice/data channel of one of the mobile subscriber stations 46 is digitized by an analog-to-digital converter and then processed by a well-known digital implementation of a low pass filter as indicated in FIG. 4 at 182. Output samples of the filtering stage 182 are then stored at 184 for the filtering and prediction functions and are passed to a window comparison operation at 186 for the gain control function. The filtering function is then accomplished by extracting sets of N samples from the set of stored signal samples, and averaging the sets of samples for N=1, 4, 8. Each of the averages is scaled by the factors A, B, and C, respectively, and then stored at 188. The items stored at 188 correspond to the three inputs of the summer 124 in FIG. 3. The stored terms are then summed, and the sum is then compared to a reference to provide the output signal, this output signal corresponding to the comparator 130 of FIG. 3.

The prediction function is obtained as a branching operation from the foregoing filtering procedure. The output of the averaging process at 190 is attained via line 192 for two cases of n=4 and one case for N=8, the three values being stored. A value for n=8 is then subtracted from a fade strength reference, and multiplied at 194 by the elapsed time between the two averages obtained for n=4. The two averages in the cases for n=4 are then subtracted from each other at 196. The output signal from the operation at 194 is then divided by the output signal of the operation at 196, the division occurring at 198. The resultant quotient at 198 is then compared to the three-second time reference to provide an output signal which corresponds to that of the comparator 154 of FIG. 3.

The gain control function is obtained by use of the window comparison operation at 186 wherein three possible outputs are obtained. In the event that the signal strength is of acceptable amplitude, a reference value of gain is stored, which value is then outputted as the gain control signal. In the event that the signal strength is too high, the comparison operation results in a command to decrement the stored value of gain to provide a lowered output signal. In the event that the signal strength is too low, the comparator initiates an operation for incrementing the value of the stored gain to provide an increased output gain signal. The output gain signal corresponds to that on line 94 of FIG. 3.

The foregoing description has provided an improvement for cellular mobile telephony wherein a filtered voice signal is available for determining when a hand-off should be initiated. An additional feature of the invention is the provision of a prediction as to when the voice signal will drop below an acceptable level of transmission at which point the hand-off is required. Also included is a provision for varying the strength of the voice/data signal propagating between a mobile subscriber station and a cell site antenna to increase the reliability of such transmission when such increased signal strength can be accommodated without interference with communication at distant cells.

It is to be understood that the above described embodiments of the invention are illustrative only, and that modifications thereof may occur to those skilled in the art. Accordingly, this invention is not to be regarded as limited to the embodiments disclosed herein, but it is to be limited only as defined by the appended claims.

What is claimed is:

1. In a cellular mobile communication system wherein mobile transceivers can communicate with each other, the system being arranged in a set of cells wherein each cell has a cell station for communication with individual ones of said mobile transceivers, a cluster of said cells having a network station through which said cell stations communicate with each other, said network station operating in conjunction with hand-off apparatus for handing off a transceiver from a first of said cells to a second of said cells as the transceiver travels from the first cell to the second cell; the improvement wherein said hand-off apparatus comprises:

means for measuring the strength of a transceiver signal received from one of said mobile transceivers as the transceiver approaches an interface between said first cell and second cell, said measuring means including means for sampling the received signal to provide samples thereof;

means for storing a succession of said samples;

first averaging means coupled to said storing means for providing a short term average of samples in said succession of samples;

second averaging means coupled to said storing means for providing a long term average of samples in said succession of samples;

summing means coupled to said first and said second averaging means for summing a recent sample of said succession with said short term average and said long term average to provide a filtered replica of said received signals; and means coupled to said summing means for signaling said hand-off apparatus to initiate a hand-off when the amplitude of said filtered replica drops below a predetermined value, said signaling means including means for comparing the amplitude of said filtered replica with a reference signal having said predetermined value.

2. In a cellular communication system, a hand-off apparatus according to claim 1 wherein said summing means includes means for scaling said recent sample, said short term average and said long term average with individual weighting factors prior to summing together the respective values of said recent sample and said short and said long term averages.

3. In a cellular communication system, a hand-off apparatus according to claim 2 wherein the number of samples in said long term average is double the number of samples in said short term average.

4. In a cellular communication system, a hand-off apparatus according to claim 3 wherein said recent sample is the last sample in said succession and wherein communication between a transceiver and a cell station is accomplished by radio-telephone links.

5. In a cellular communication system, a hand-off apparatus according to claim 1 further comprising:

means for subtracting one sample of said succession from a second sample of said succession spaced apart by a predetermined interval of time from said one sample to establish a rate of change in signal strength;

means responsive to said rate of change for predicting the time elapsed during a fading of the received signal amplitude to said predetermined value; and means coupled to said predicting means for directing a hand-off prior to completion of said elapsed time.

6. In a cellular communication system, a hand-off apparatus according to claim 1 further comprising second means for comparing said received signal strength with a set of reference signals designating an acceptable range of signal strength and means coupled to second comparing means for commanding a change in magnitude of the transceiver signal.

7. In a cellular communication system, a hand-off apparatus according to claim 6 wherein said commanding means transmits a gain control signal to a transmitter portion of a mobile transceiver, said commanding means including means for limiting the magnitude of said gain control signal so as to maintain an upper bound on the magnitude of the transceiver signal.

8. In a cellular mobile communication system wherein mobile transceivers can communicate with each other, the system being arranged in a set of cells wherein each cell has a cell station for communication with individual ones of said mobile transceivers, a cluster of said cells having a network station through which said cell stations communicate with each other, said network station operating in conjunction with hand-off apparatus for handing off a transceiver from a first of said cells to a second of said cells as the tranceiver travels from the first cell to the second cell; a method for operation of said hand-off apparatus comprising the steps of:

receiving a transceiver signal repetitively at predetermined instants of time to provide a sequence of samples;

filtering the sequence of samples to provide filtered replicas of the transceiver signal; said filtering including an averaging of signal samples over a first interval of time and over a second interval of time to provide average values of said signal samples, and combining said average values with a recent sample of said sequence;

comparing said filtered replicas to a reference; and directing said hand-off apparatus to initiate a hand-off when the magnitude of the filtered replicas drops below the reference.

9. In a cellular communication system, a method according to claim 8 wherein said combining includes the step of weighting said recent sample and each of said average values.

10. In a cellular communication system, a method according to claim 9 wherein said second interval of time is larger than and overlaps said first interval of time.

11. In a cellular communication system, a method according to claim 10 wherein said recent sample is the last sample in said sequence of samples.

12. In a cellular communication system, a method according to claim 8 further comprising the steps of:

subtracting one sample of said sequence from a second sample of said sequence to provide a differential value;

computing a rate of change in amplitude of said filtered replicas by use of said differential value;

predicting by said rate of change a time elasped for the magnitude of said filtered replicas to fall below said reference; and directing a hand-off before termination of said elapsed time.

13. In a cellular communication system, a method according to claim 8 further comprising the steps of;
comparing the transceiver signal strength with a range of reference signals; and
commanding a change in transceiver signal strength when a received transceiver signal falls outside said range of reference signals.

14. In a cellular communication system, a method according to claim 13 wherein said change in signal strength is accomplished by varying a gain in a transmitter amplifier of said transceiver; and further comprising the step of limiting said gain so as to maintain an upper bound on the magnitude of the transceiver signal.

* * * * *